US011182572B2

(12) United States Patent
Gururaja et al.

(10) Patent No.: US 11,182,572 B2
(45) Date of Patent: Nov. 23, 2021

(54) SYSTEM AND METHOD OF SELECTIVE AUXILIARY DATA CAPTURE

(71) Applicant: ZEBRA TECHNOLOGIES CORPORATION, Lincolnshire, IL (US)

(72) Inventors: Abhilash Gururaja, Levittown, NY (US); Christopher J. Fjellstad, Smithtown, NY (US); David R. Turturro, Farmingville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 149 days.

(21) Appl. No.: 16/723,163

(22) Filed: Dec. 20, 2019

(65) Prior Publication Data

US 2021/0192160 A1 Jun. 24, 2021

(51) Int. Cl.
*G06K 7/10* (2006.01)
*G06K 7/14* (2006.01)
*G01G 23/28* (2006.01)
*H04N 5/33* (2006.01)

(52) U.S. Cl.
CPC ......... *G06K 7/10732* (2013.01); *G01G 23/28* (2013.01); *G06K 7/10861* (2013.01); *H04N 5/33* (2013.01); *G06K 2207/1012* (2013.01)

(58) Field of Classification Search
CPC ...... H04N 5/33; H04N 5/2254; H04N 5/2256; H04N 5/2351; H04N 5/2354; G06K 2009/00932; G06K 9/00; G06K 9/00026; G06K 2207/1012; G06K 7/10732; G06K 7/10861; G06K 9/00771; G06K 9/00838; G06K 9/6267; G01G 23/28
See application file for complete search history.

(56) References Cited

U.S. PATENT DOCUMENTS

| | | | |
|---|---|---|---|
| 7,527,207 B2 | 5/2009 | Acosta et al. |
| 7,546,952 B2 | 6/2009 | Knowles et al. |
| 7,571,858 B2 | 8/2009 | Knowles et al. |
| 7,575,170 B2 | 8/2009 | Knowles et al. |
| 7,588,188 B2 | 9/2009 | Knowles et al. |
| 7,614,560 B2 | 11/2009 | Knowles et al. |
| 7,661,597 B2 | 2/2010 | Knowles et al. |
| 7,665,665 B2 | 2/2010 | Knowles et al. |
| 7,731,091 B2 | 6/2010 | Knowles et al. |
| 7,762,465 B2 | 7/2010 | Knowles et al. |
| 7,770,796 B2 | 8/2010 | Knowles et al. |
| 7,775,436 B2 | 8/2010 | Knowles et al. |
| 7,784,695 B2 | 8/2010 | Knowles et al. |

(Continued)

*Primary Examiner* — Thien T Mai
(74) *Attorney, Agent, or Firm* — Yuri Astvatsaturov

(57) ABSTRACT

A method of auxiliary data capture control includes: storing, at a data capture device, a trigger condition and a baseline infrared value captured by an infrared sensor; controlling the infrared sensor to obtain captured infrared data; determining, based on the captured infrared data and the baseline infrared value, whether the trigger condition is satisfied, wherein the trigger condition includes whether the captured infrared data exceeds the baseline infrared value and whether a variance in the captured infrared data over a configurable time period is below a variance threshold; and when the trigger condition is satisfied, controlling an auxiliary data capture sensor to obtain auxiliary captured data.

16 Claims, 4 Drawing Sheets

(56) References Cited

U.S. PATENT DOCUMENTS

| | | |
|---|---|---|
| 7,784,698 B2 | 8/2010 | Knowles et al. |
| 7,793,841 B2 | 9/2010 | Knowles et al. |
| 7,798,410 B2 | 9/2010 | Carlson et al. |
| 7,806,335 B2 | 10/2010 | Knowles et al. |
| 7,806,336 B2 | 10/2010 | Knowles et al. |
| 7,878,407 B2 | 2/2011 | Knowles et al. |
| 7,954,719 B2 | 6/2011 | Zhu et al. |
| 8,042,740 B2 | 10/2011 | Knowles et al. |
| 8,172,141 B2 | 5/2012 | Knowles et al. |
| 8,172,145 B2 | 5/2012 | Rudeen |
| 8,269,868 B2 | 9/2012 | Olmstead et al. |
| 8,322,617 B2 | 12/2012 | Cherry |
| 8,459,556 B2 | 6/2013 | Zhou |
| 8,479,994 B2 | 7/2013 | Nahill et al. |
| 8,590,789 B2 | 11/2013 | Nahill et al. |
| 8,632,011 B2 | 1/2014 | Gao |
| 8,727,218 B1 | 5/2014 | Handshaw et al. |
| 8,847,150 B2 | 9/2014 | Handshaw et al. |
| 9,016,582 B2 | 4/2015 | Panday et al. |
| 9,111,166 B2 | 8/2015 | Cunningham, IV |
| 9,298,957 B2 | 3/2016 | Joseph et al. |
| 9,530,038 B2 | 12/2016 | Xian et al. |
| 9,569,653 B1 | 2/2017 | Suman |
| 9,589,169 B2 | 3/2017 | Cunningham, IV |
| 10,049,247 B2 | 8/2018 | Gao |
| 10,127,538 B2 | 11/2018 | Saeed et al. |
| 10,185,859 B2 | 1/2019 | Cunningham, IV |
| 2004/0182930 A1* | 9/2004 | Nojiri ............... G06K 19/06131 235/462.04 |
| 2008/0112600 A1* | 5/2008 | Miura ....................... G06K 9/00 382/125 |
| 2008/0249884 A1 | 10/2008 | Knowles et al. |
| 2008/0304111 A1* | 12/2008 | Queenan ............... G06K 7/0008 358/302 |
| 2009/0134221 A1 | 5/2009 | Zhu et al. |
| 2010/0320272 A1 | 12/2010 | Carlson et al. |
| 2012/0284091 A1 | 11/2012 | Colavito |
| 2013/0026233 A1* | 1/2013 | Chen .................... G06K 7/1096 235/440 |
| 2013/0146666 A1* | 6/2013 | Ding .................... G06K 7/1095 235/455 |
| 2014/0070005 A1 | 3/2014 | Nahill et al. |
| 2017/0193259 A1 | 7/2017 | Xian et al. |
| 2018/0314863 A1 | 11/2018 | Gao et al. |
| 2019/0370721 A1 | 12/2019 | Issac |
| 2020/0018653 A1* | 1/2020 | Matsumiya ............... G01J 1/44 |
| 2020/0336686 A1* | 10/2020 | Hosaka .................... H03M 1/12 |
| 2021/0006756 A1* | 1/2021 | Sato ................... H04N 9/04553 |
| 2021/0089040 A1* | 3/2021 | Ebrahimi Afrouzi ........................ A47L 9/2894 |
| 2021/0112647 A1* | 4/2021 | Coleman ................ F21V 14/02 |
| 2021/0153743 A1* | 5/2021 | Morales Delgado ..... G06T 5/50 |

\* cited by examiner

SYSTEM AND METHOD OF SELECTIVE AUXILIARY DATA CAPTURE

BACKGROUND

Data capture devices, such as barcode scanners, can capture various types of data, and provide such data to host computers for further processing. Certain types of data, such as images, can be computationally costly for the host computers to process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
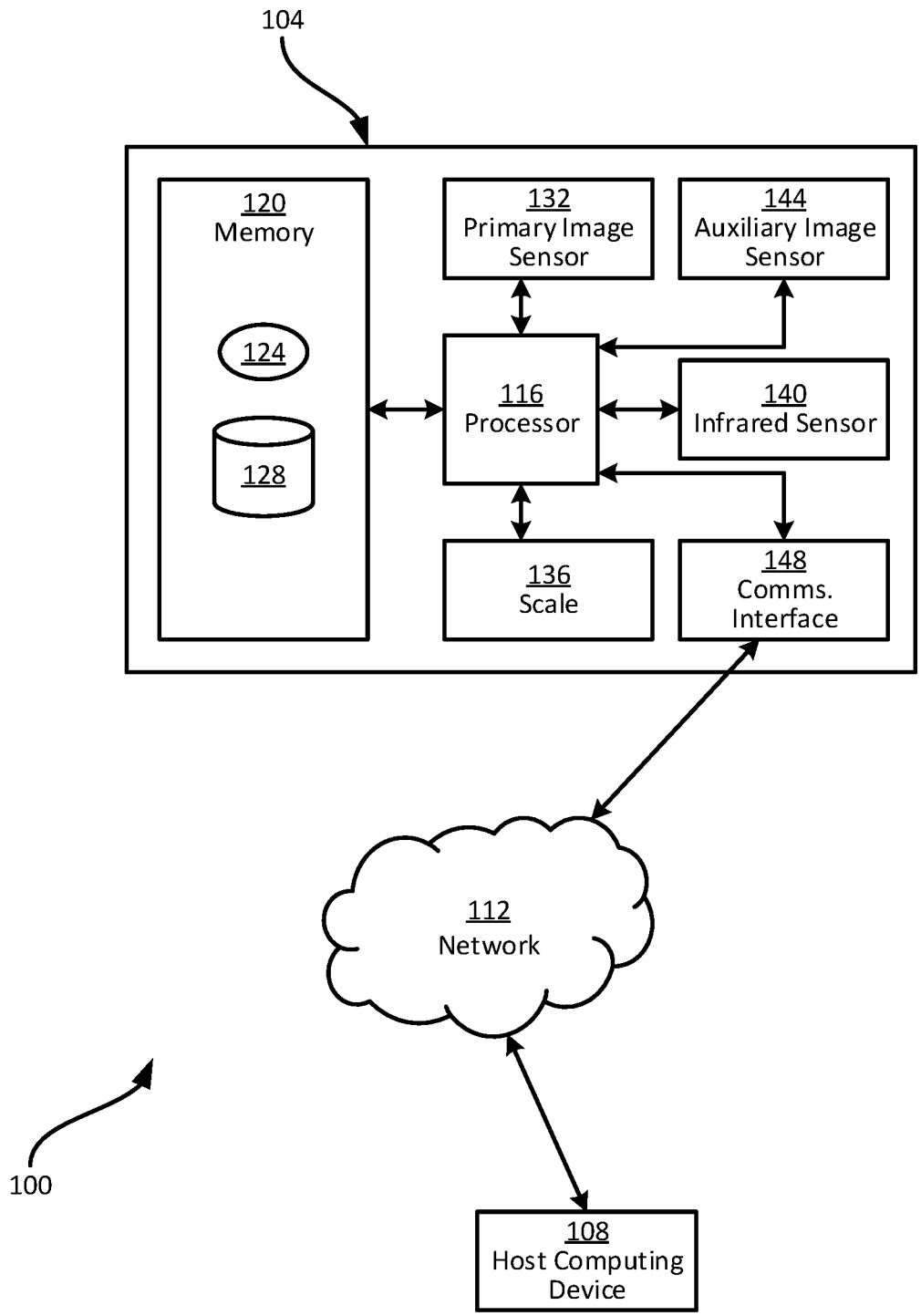
FIG. 1 is a block diagram of a system for selective auxiliary data capture.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of auxiliary data capture control, the method comprising: storing, at a data capture device, a trigger condition and a baseline infrared value captured by an infrared sensor; controlling the infrared sensor to obtain captured infrared data; determining, based on the captured infrared data and the baseline infrared value, whether the trigger condition is satisfied, wherein the trigger condition includes whether the captured infrared data exceeds the baseline infrared value and whether a variance in the captured infrared data over a configurable time period is below a variance threshold; and when the trigger condition is satisfied, controlling an auxiliary data capture sensor to obtain auxiliary captured data.

Additional examples disclosed herein are directed to a data capture device comprising: a memory storing a trigger condition and a baseline infrared value; an infrared sensor; an auxiliary data capture sensor; and a processor connected with the memory, the infrared sensor and the auxiliary data capture sensor, the processor configured to: control the infrared sensor to obtain captured infrared data; determine, based on the captured infrared data and the baseline infrared value, whether the trigger condition is satisfied, wherein the trigger condition includes whether the captured infrared data exceeds the baseline infrared value and whether a variance in the captured infrared data over a configurable time period is below a variance threshold; and when the trigger condition is satisfied, control the auxiliary data capture sensor to obtain auxiliary captured data.

FIG. 1 illustrates a system 100 for capturing primary and auxiliary data associated with items. Example items include products in a retail facility. Primary data associated with such items can include product identifiers such as Universal Product Codes (UPCs), which may be encoded in a barcode affixed to an item or stored in a radio frequency identification (RFID) tag affixed to the item. Another example of primary data includes a weight of the item. A further example of primary data includes an indication of the presence of an Electronic Article Surveillance (EAS) tag affixed to the item.

The system 100 includes a data capture device 104 configured to capture the above-mentioned primary data. The data capture device 104 can provide the primary data to a host computing device 108, for example via a network 112, which can include any suitable combination of local and wide-area networks. The host computing device 108 can include, for example, a point-of-sale (PoS) computing device configured to further process the primary data. Such processing can include retrieving additional information (e.g. a price) from a database stored at, or otherwise connected with, the host computing device 108. Such information can be presented on a display of the host computing device, printed on a receipt, and the like.

The host computing device 108 can also be configured to perform other functions that employ data beyond the primary data mentioned above, referred to as auxiliary data. For example, the host computing device 108 can be configured to implement at least one item recognition mechanism, for example to detect the type of an item when the item does not carry a product identifier (e.g. encoded in a barcode or RFID tag). Another example function that uses auxiliary data includes storing an image of the surroundings of the data capture device 104 at the time that the primary data was captured, e.g. for security purposes.

The auxiliary data includes image data in the examples discussed herein, although in other examples the auxiliary data can include other types of data in addition to, or instead of, image data. Implementing functions that use auxiliary data can be costly in terms of computational and storage resources. Therefore, the system 100 enables selective capture of auxiliary data that may mitigate the above-mentioned computational and storage costs.

The data capture device 104 includes a controller such as a central processing unit (CPU), also referred to as a processor 116 interconnected with a non-transitory computer readable storage medium, such as a memory 120. The memory 120 includes any suitable combination of volatile memory (e.g. Random Access Memory (RAM)) and non-volatile memory (e.g. read only memory (ROM), Electrically Erasable Programmable Read Only Memory (EEPROM), flash). The processor 116 and the memory 120 each comprise one or more integrated circuits (ICs).

The processor 116, as will be discussed in greater detail below, controls various data capture sensors of the data capture device 104 to capture the above-mentioned primary and auxiliary data. Specifically, the processor 116 also controls an infrared sensor 140 of the data capture device 104 to capture infrared data and determines, based on the captured infrared data, when to capture auxiliary data. In particular, the processor 116 executes machine-readable instructions stored in the memory 120 and referred to herein as a data capture control application 124 (or simply as the application 124) to perform the above functionality. Execution of the application 124 configures the processor 116 to capture and provide primary data to the host computing device 108 and to selectively control the capture of auxiliary data based on a trigger condition. The processor 116 may determine whether to trigger the capture of auxiliary data based at least in part on a repository 128 stored in the memory 120.

The repository 128 contains a baseline infrared value. When infrared data is captured, it is compared against the baseline infrared value to determine when the processor 116 is to initiate the capture of auxiliary data. The baseline infrared value represents the amount of infrared light detected by the infrared sensor 140 of the data capture device 104 based on the environment when no items are in a scan volume. In some examples, the baseline infrared value may be set by the data capture device 104 on initialization. For example, when the data capture device 104 is initially booted up, in response to the initialization, the processor 116 may control the infrared sensor 140 to capture initial infrared data and set the baseline infrared value based on the initial infrared data. In other examples, the baseline infrared value may be preconfigured, or otherwise dynamically calculated by the device 104.

In other examples, the contents of the repository 128 can be integrated into the application 124. In addition, the functionality discussed herein need not be implemented via the execution of a single application. In other examples, the memory 120 can store at least one application enabling the processor 116 to control the data capture sensors mentioned earlier. Such an application may expose, via an application programming interface (API) or the like, event identifiers to an additional application that determines when to capture auxiliary data.

The above-mentioned data capture sensors include a primary image sensor 132, the infrared sensor 140, and an auxiliary image sensor 144. In the present example, the data capture sensors further include a weigh-scale 136 (also referred to as simply a scale 136). In other examples, the data capture device 104 may not include a scale. Additionally, the data capture sensors may include further data capture sensors, including a short-range communications assembly, a laser-based barcode scanner (e.g., instead of, or in addition to, the primary image sensor 132), and the like. The auxiliary image sensor 144, in this example, is a color image sensor, while the primary image sensor 132 can be a black and white image sensor. Further, the auxiliary image sensor 144 may have a greater resolution than the primary image sensor 132. The infrared sensor 140 can include an infrared emitter and an infrared detector to detect infrared light reflected back towards the infrared sensor 140.

The data capture device 104 also includes a communications interface 148, enabling the data capture device 104 to exchange data with other computing devices, such as the host computing device 108. The communications interface 148 includes any suitable hardware (e.g. Network Interface Controllers (NICs), Universal Serial Bus (USB) controllers, and the like) allowing the data capture device 104 to communicate over the network 112.

Figure 2:
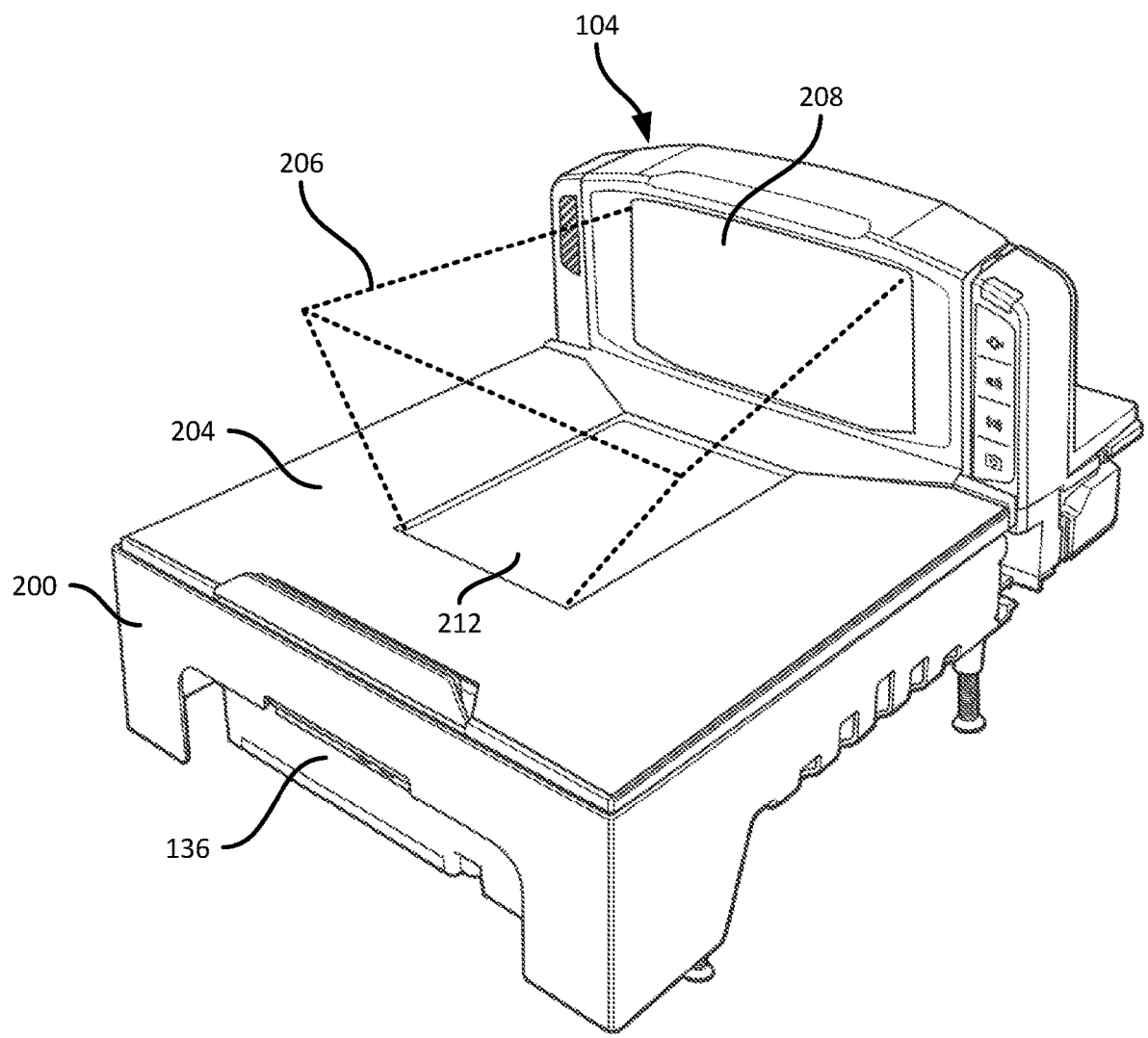
FIG. 2 is an isometric view of a data capture device of the system of FIG. 1.

The above-mentioned components of the data capture device 104 can be implemented in various form factors. Turning to FIG. 2, an example data capture device 104 is shown in the form of a bioptic scanner that can be mounted in a retail checkout countertop or other support surface.

In the example illustrated in FIG. 2, the data capture device 104 includes a housing 200 containing the components mentioned above in connection with FIG. 1. The housing defines a platform 204 on which items may be placed and over which a scan volume 206 is defined, e.g. by scan windows 208 and 212. The primary image sensor 132 has a field of view extending from at least one of the windows 208 and 212. The data capture device 104 can include an optical assembly enabling the primary image sensor 132 to capture images via either window 208 and 212, or the data capture device 104 can include two primary image sensors, with respective fields of view traversing the scan windows 208 and 212. The scale 136 is coupled to the platform 204 and is configured to detect the weight of items on the platform 204. The infrared sensor 140 also has a field of view extending from at least one of the windows 208 and 212 and is configured to detect reflected infrared light from items in the scan volume 206.

The auxiliary image sensor 144 is also disposed within the housing 200 such that a field of view of the auxiliary image sensor 144 extends from one of the scan windows 208 and 212. In other examples, however, the auxiliary image sensor 144 can be contained in another housing separate from the housing 200, and communicatively coupled with the processor 116 (within the housing 200). In further examples, the auxiliary image sensor 144 can be deployed along with an auxiliary controller distinct from the processor 116, and an auxiliary communications interface (e.g. a USB interface) distinct from the interface 148. In such implementations, the auxiliary controller can communicate with both the processor 116 and the host computing device 108.

As will be apparent to those skilled in the art, primary data capture may be initiated by passing an item through the scan volume 206, placing an item on the platform 204, activating an input of the device 104, or the like. For example, the data capture device 104 may employ a wakeup system based on the infrared sensor 140. When detected infrared data is at the baseline infrared value for a configurable time period, the data capture device 104 may enter a stand-by mode. In the stand-by mode, the primary image sensor 132 and the scale 136 are disabled to conserve power consumed by the data capture device 104. Upon detecting a change in the captured infrared data above the baseline infrared value, the data capture device 104 may wake up and initiate primary data capture by the primary image sensor 132.

Figure 3:
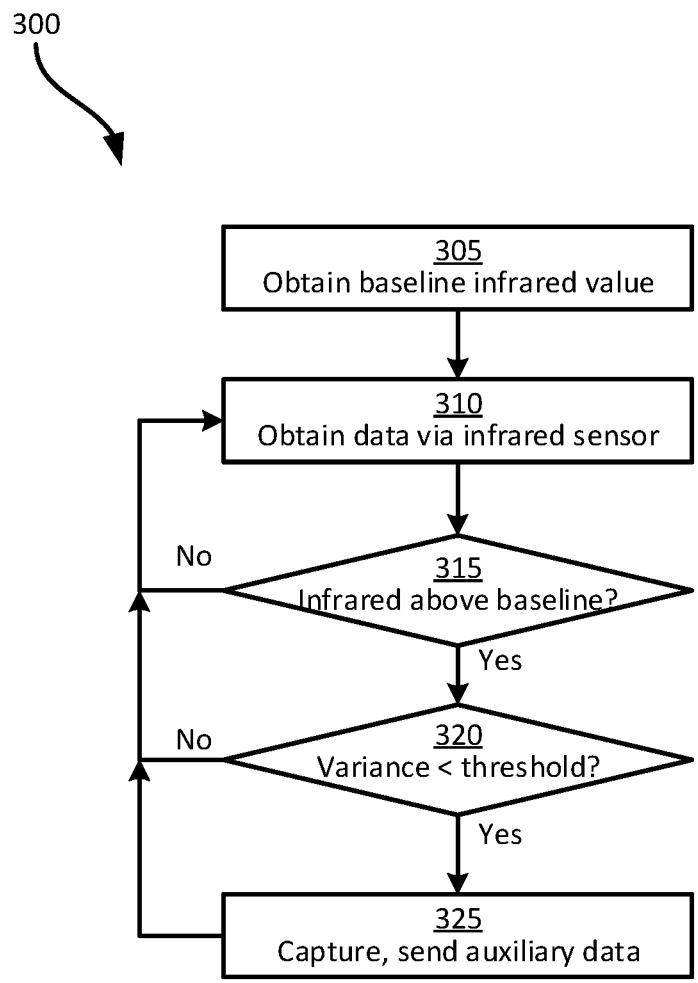
FIG. 3 is a flowchart of a method of selective auxiliary data capture.

Turning now to FIG. 3, the actions performed by the data capture device 104 during primary data capture operations in order to control auxiliary data capture will be described in greater detail. FIG. 3 illustrates a method 300 of selective auxiliary data capture. The method 300 will be described below in conjunction with its performance in the system 100, and in particular, by the data capture device 104. It is contemplated, however, that the method 300 can also be performed in various other suitable systems.

At block 305, the data capture device 104 is configured to obtain the baseline infrared value. For example, the processor 116 may retrieve the baseline infrared value from the repository 128.

At block 310, the data capture device 104 is configured to control the infrared sensor 140 to capture infrared data. In particular, controlling the infrared sensor 140 to capture infrared data may include obtaining an amount of infrared light detected by the infrared sensor 140.

The data capture device 104 may further be configured, at block 310, to control the primary image sensor 132, or other primary data capture sensors, such as a barcode scanner or the like, to obtain primary data. The data capture device 104 may be configured to process the primary data and/or transmit the primary data to the host computing device 108 for processing. For example, when a barcode or other indicium is detected by an image captured by the primary image sensor 132, and data is successfully decoded from the barcode, the data capture device 104 can be configured to transmit the decoded data to the host computing device 108. In other examples, the data capture device 104 may process the primary data and transmit the primary data to the host computing device at block 325, in conjunction with the auxiliary data.

At blocks 315 and 320, the data capture device 104 is configured to determine whether the trigger condition is satisfied to trigger the auxiliary data capture sensor 144 to obtain auxiliary captured data. Specifically, the data capture device 104 is configured to determine whether the infrared data captured at block 310 exceeds the baseline infrared value. When an item is present in the scan volume 206, the infrared light reflected from the item and detected by the infrared sensor 140 exceeds the baseline infrared value. In some examples, the processor 116 may determine whether the captured infrared data exceeds the baseline infrared value by a configurable threshold. When the captured infrared data exceeds the baseline infrared value by at least the threshold, the processor 116 may determine that an item is present in the scan volume 206. When the captured infrared data exceeds the baseline infrared value by less than the threshold, the infrared sensor 140 may be detecting changes in infrared due to environmental changes (e.g., moving objects outside the scan volume 206). When the determination at block 315 is negative, the processor 116 returns to block 310.

When the determination at block 315 is affirmative, at block 320, the processor 116 determines whether a variance in the signal from the infrared sensor 140 falls below a variance threshold. The threshold applied at block 320 is such that variance below the threshold indicates that the item in the scan volume 206 is substantially stationary. Variance above the threshold indicates that the item is in motion, and that it may therefore not currently be feasible to capture an auxiliary image of the item. For example, the threshold can include a time period (e.g., 0.5 seconds, although other time periods may also be employed) and a maximum permitted change in the data received from the infrared sensor 140 over the time period. For example, the maximum permitted change may be a maximum change between any consecutive infrared data samples in the time period, or a maximum cumulative change over all infrared data samples within the time period.

When the determination at block 320 is negative, indicating that the item is in motion, the processor 116 can repeat block 320, or simply return to block 310. When the determination at block 320 is affirmative, the processor 116 proceeds to block 325.

At block 325, the processor 116 controls the auxiliary image sensor 144 to capture an image frame and sends the captured image frame to the host computing device 108. In other examples, the auxiliary image sensor 144 operates in a video mode, and therefore captures a stream of image frames throughout the performance of the method 300. In such examples, at block 325, the processor 116 is configured to retrieve the most recent frame captured by the auxiliary image sensor 144 and transmit the retrieved image frame to the host computing device 108. The processor 116 then returns to block 305. In other examples, rather than capturing the most recent frame, the processor 116 may identify a time corresponding to an event of interest (i.e., a time at which the trigger event was satisfied) and retrieve the frame captured by the auxiliary image sensor 144 having a corresponding timestamp. By using the infrared data to detect the presence and stability of items in the scan volume 206, the system is enabled to capture image frames for processing (e.g., item recognition or the like) by the host computing device 108.

Figure 4:
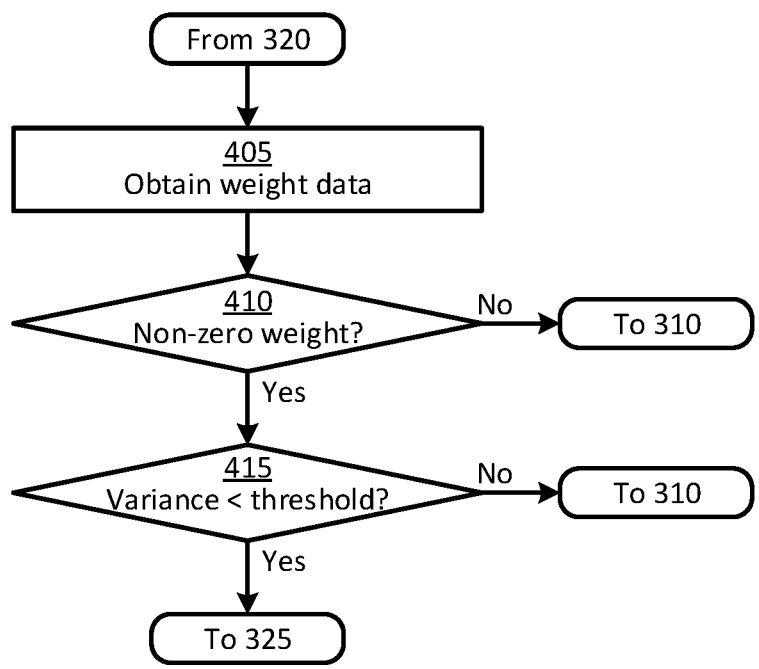
FIG. 4 is a flowchart of a method of verifying trigger conditions during the method of FIG. 3.

In some examples, after an affirmative determination at block 320, the processor 116 may evaluate additional data to determine whether the trigger condition is satisfied to trigger the auxiliary data capture sensor to obtain auxiliary captured data. In particular, the additional criteria of the trigger condition may verify the presence and stability (i.e., lack of motion) of the item in the scan volume 206. For example, turning to FIG. 4, an example method 400 is illustrated. The method 400 may be performed when the data capture device 104 includes the scale 136.

At block 405, the processor 116 obtains weight data from the scale 136.

At block 410, the processor 116 is configured to determine whether the data received from the scale 136 indicates a non-zero weight. That is, the processor 116 determines whether an item is present on the platform 204. When the determination at block 410 is negative because the data from the scale 136 indicates zero weight (or a weight below a configurable threshold), the processor 116 returns to block 310.

When the determination at block 410 is affirmative, at block 415 the processor 116 determines whether a variance in the data from the scale 136 falls below a threshold. The threshold applied at block 415 is selected such that variance below the threshold indicates that the item on the platform 204 is substantially stationary. Variance above the threshold indicates that the item is in motion, and that it may therefore not currently be feasible to obtain an accurate weight or to capture an auxiliary image of the item. For example, the threshold can include a time period (e.g. 0.5 seconds, although other time periods may also be employed) and a maximum permitted change in the data received from the scale 136 over the time period (e.g. 1 gram, although various other permitted changes can also be employed).

When the determination at block 415 is negative, indicating that the item is in motion, the processor 116 can repeat block 415, or simply return to block 310. When the determination at block 415 is affirmative, the processor 116 proceeds to block 325, as discussed above.

The repository 128 can also include additional data, for example to specify auxiliary data capture parameters. For example, each event registration can specify different capture parameters (e.g. exposure time, flash and the like) for controlling the auxiliary image sensor 144. In other examples, the data capture device 104 can include multiple auxiliary data capture sensors, and different event registrations can configure the processor 116 to activate different ones of the auxiliary data capture sensors.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a scale CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of auxiliary data capture control, the method comprising:
   storing, at a data capture device, a trigger condition and a baseline infrared value captured by an infrared sensor;
   controlling the infrared sensor to obtain captured infrared data;
   determining, based on the captured infrared data and the baseline infrared value, whether the trigger condition is satisfied, wherein the trigger condition includes whether the captured infrared data exceeds the baseline infrared value and whether a variance in the captured infrared data over a configurable time period is below a variance threshold; and
   when the trigger condition is satisfied, controlling an auxiliary data capture sensor to obtain auxiliary captured data.

2. The method of claim 1, further comprising transmitting the auxiliary captured data to a host computing device.

3. The method of claim 1, wherein the trigger condition further includes whether the captured infrared data exceeds the baseline infrared value by a threshold.

4. The method of claim 1, wherein controlling the auxiliary data capture sensor to obtain auxiliary captured data includes controlling an auxiliary image sensor to capture an image frame.

5. The method of claim 1, wherein the auxiliary data capture sensor is an auxiliary image sensor operating in a video mode; and wherein controlling the auxiliary data capture sensor to obtain auxiliary captured data includes retrieving a most recent frame captured by the auxiliary image sensor.

6. The method of claim 1, wherein the auxiliary data capture sensor is an auxiliary image sensor operating in a video mode; and wherein controlling the auxiliary data capture sensor to obtain auxiliary captured data includes retrieving a frame captured by the auxiliary image sensor, the frame having a timestamp corresponding to a time at which the trigger condition was satisfied.

7. The method of claim 1, further comprising capturing weight data; and wherein the trigger condition further includes:
   whether the weight data is non-zero; and
   whether a variance in the weight data over a configurable time period is below a threshold.

8. The method of claim 1, further comprising:
in response to the data capture device initializing, capturing initial infrared data; and
setting the baseline infrared value based on the initial infrared data.

9. A data capture device comprising:
a memory storing a trigger condition and a baseline infrared value;
an infrared sensor;
an auxiliary data capture sensor; and
a processor connected with the memory, the infrared sensor and the auxiliary data capture sensor, the processor configured to:
control the infrared sensor to obtain captured infrared data;
determine, based on the captured infrared data and the baseline infrared value, whether the trigger condition is satisfied, wherein the trigger condition includes whether the captured infrared data exceeds the baseline infrared value and whether a variance in the captured infrared data over a configurable time period is below a variance threshold; and
when the trigger condition is satisfied, control the auxiliary data capture sensor to obtain auxiliary captured data.

10. The data capture device of claim 9, further comprising a communications interface; and
wherein the processor is further configured to transmit the auxiliary captured data to a host computing device via the communications interface.

11. The data capture device of claim 9, wherein the trigger condition further includes whether the captured infrared data exceeds the baseline infrared value by a threshold.

12. The data capture device of claim 9, wherein the auxiliary data capture sensor is an image sensor, and wherein the processor is configured to control the auxiliary data capture sensor to capture an image frame.

13. The data capture device of claim 9, wherein the auxiliary data capture sensor is an auxiliary image sensor operating in a video mode; and wherein the processor is configured to control the auxiliary data capture sensor to obtain auxiliary captured data by retrieving a most recent frame captured by the auxiliary image sensor.

14. The data capture device of claim 9, wherein the auxiliary data capture sensor is an auxiliary image sensor operating in a video mode; and wherein the processor is configured to control the auxiliary data capture sensor to obtain auxiliary captured data by retrieving a frame captured by the auxiliary image sensor, the frame having a timestamp corresponding to a time at which the trigger condition was satisfied.

15. The data capture device of claim 9, further comprising a weigh-scale; wherein the processor is further configured to control the weigh-scale to obtain weight data; and wherein the trigger condition further includes whether the weight data is non-zero; and whether a variance in the weight data over a configurable time period is below a threshold.

16. The data capture device of claim 9, wherein the processor is further configured to:
in response to the data capture device initializing, control the infrared sensor to capture initial infrared data; and
set the baseline infrared value based on the initial infrared data.

* * * * *